United States Patent
Eom

(10) Patent No.: US 6,658,996 B2
(45) Date of Patent: Dec. 9, 2003

(54) APPARATUS FOR PROCESSING FOOD WASTE

(75) Inventor: Gwang Su Eom, Pusan (KR)

(73) Assignee: Sunbow Electronics Co., Ltd., Pusan (KR)

(*) Notice: Subject to any disclaimer, the term of this patent is extended or adjusted under 35 U.S.C. 154(b) by 0 days.

(21) Appl. No.: 10/321,819

(22) Filed: Dec. 18, 2002

(65) Prior Publication Data

US 2003/0136273 A1 Jul. 24, 2003

(30) Foreign Application Priority Data

Jan. 22, 2002 (KR) .................................. 2002-0003514

(51) Int. Cl.⁷ ............................................... A23L 1/00
(52) U.S. Cl. ................. 99/510; 99/495; 241/260.1; 366/305; 366/307; 366/318; 366/319; 366/314
(58) Field of Search ................ 99/348, 495, 509–513, 99/516, 534, 485; 366/302–307, 318–324, 314, 603; 241/91, 92, 101.01, 101.2, 101.8, 260.1, 605, 152.2, 186.2, 152.1, 261.1

(56) References Cited

U.S. PATENT DOCUMENTS

| | | | | |
|---|---|---|---|---|
| 2,246,045 A | * | 6/1941 | Hirschberg | 100/147 |
| 4,385,553 A | * | 5/1983 | Ihara et al. | 99/510 |
| 4,949,916 A | * | 8/1990 | Wroblewski | 241/152.1 |
| 5,082,188 A | * | 1/1992 | Urich | 241/56 |
| 5,429,436 A | * | 7/1995 | Stone | 366/141 |
| 5,456,416 A | * | 10/1995 | Hartwig | 241/260.1 |
| 5,462,354 A | * | 10/1995 | Neier | 366/314 |
| 5,738,003 A | * | 4/1998 | Lang | 99/513 |
| 5,809,872 A | * | 9/1998 | Sundquist | 99/492 |
| 5,863,122 A | * | 1/1999 | Tamminga | 366/314 |
| 5,970,860 A | * | 10/1999 | Yip | 99/510 |
| 6,302,014 B1 | * | 10/2001 | Kuan | 99/510 |
| 6,595,121 B1 | * | 7/2003 | Chang Chien | 99/510 |

* cited by examiner

*Primary Examiner*—Timothy F. Simone
(74) *Attorney, Agent, or Firm*—Jacobson Holman PLLC

(57) ABSTRACT

Disclosed is an apparatus for processing food waste capable of enhancing the processing performance for food waste relative to a conventional food waste processing apparatus by highly increasing contact area of between food waste and microorganisms due to complete pulverization of food waste. In the apparatus for processing food waste, a chamber is fixed on an upper surface of a table in a main body, a gear part is mounted to a lower surface of the table and a driving motor disposed below the gear part and mechanically connected with the gear part. The conical-shaped screw is disposed in the main body and includes a loading plate, a supporting axle upwardly protruding from an upper portion of the loading plate, a screw thread protruding from an outer surface of the loading plate and a cutter vertically formed at one side of a lower portion of the loading plate. A hollow truncated cone-shaped housing for enclosing the conical-shaped screw is mounted onto the conical-shaped screw within the main body. The housing includes pluralities of brackets disposed at outer sides of the housing.

3 Claims, 4 Drawing Sheets

[FIG 1] Prior Art
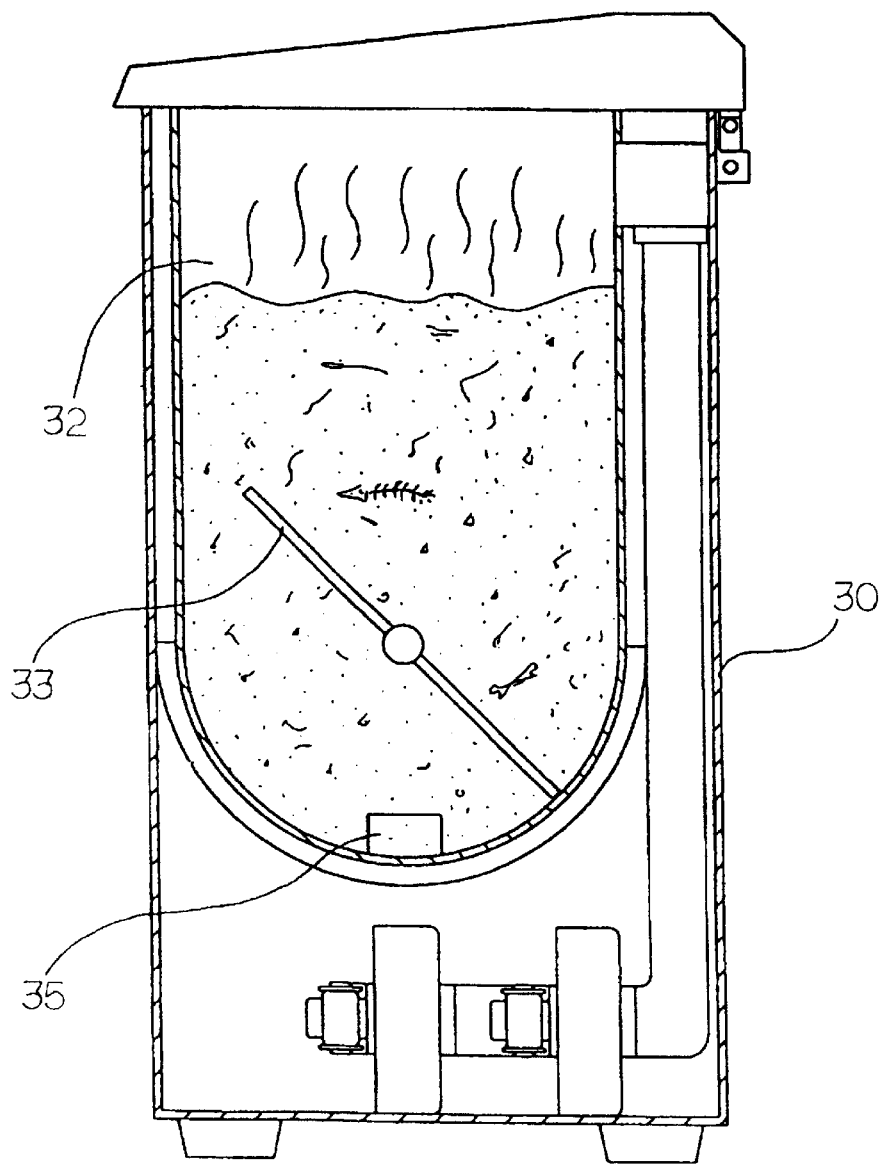

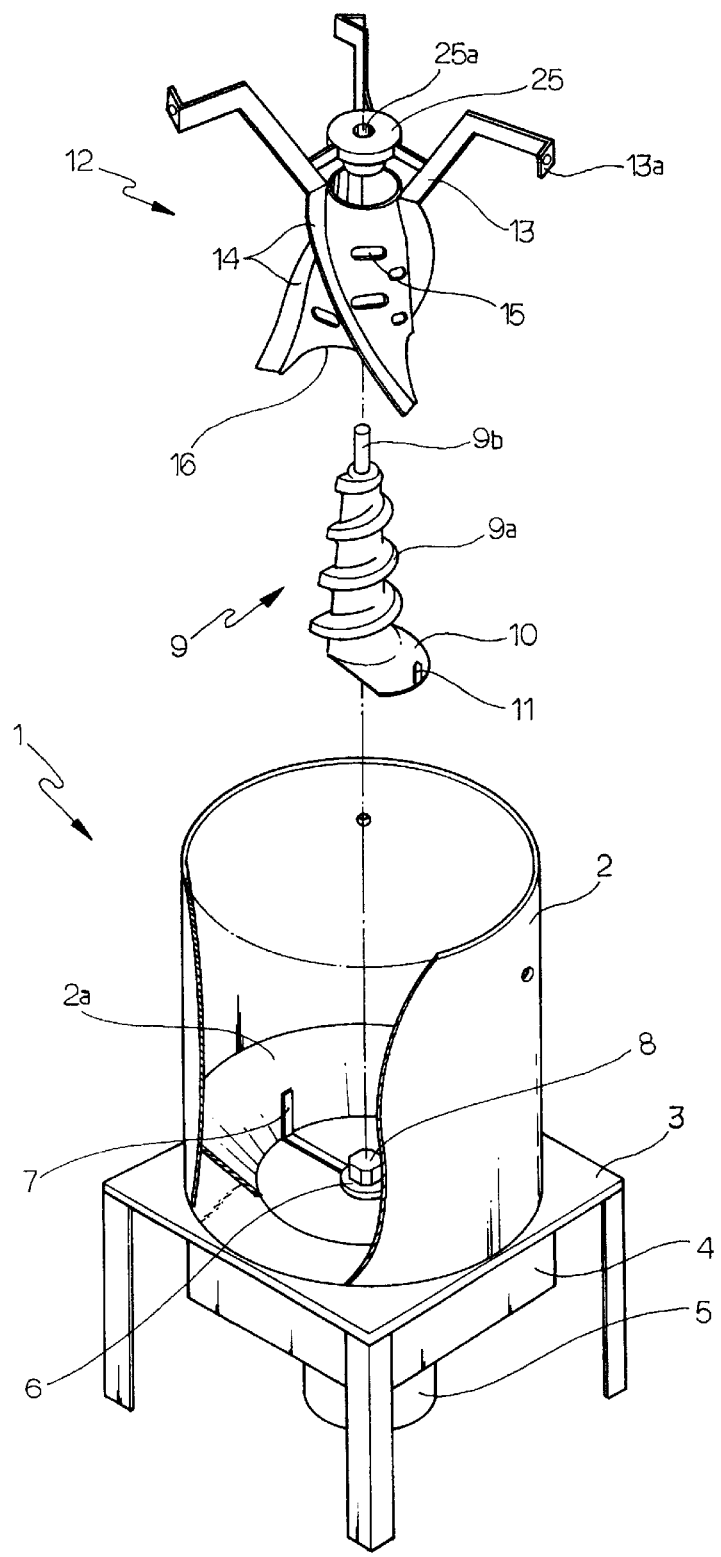
[FIG 2]

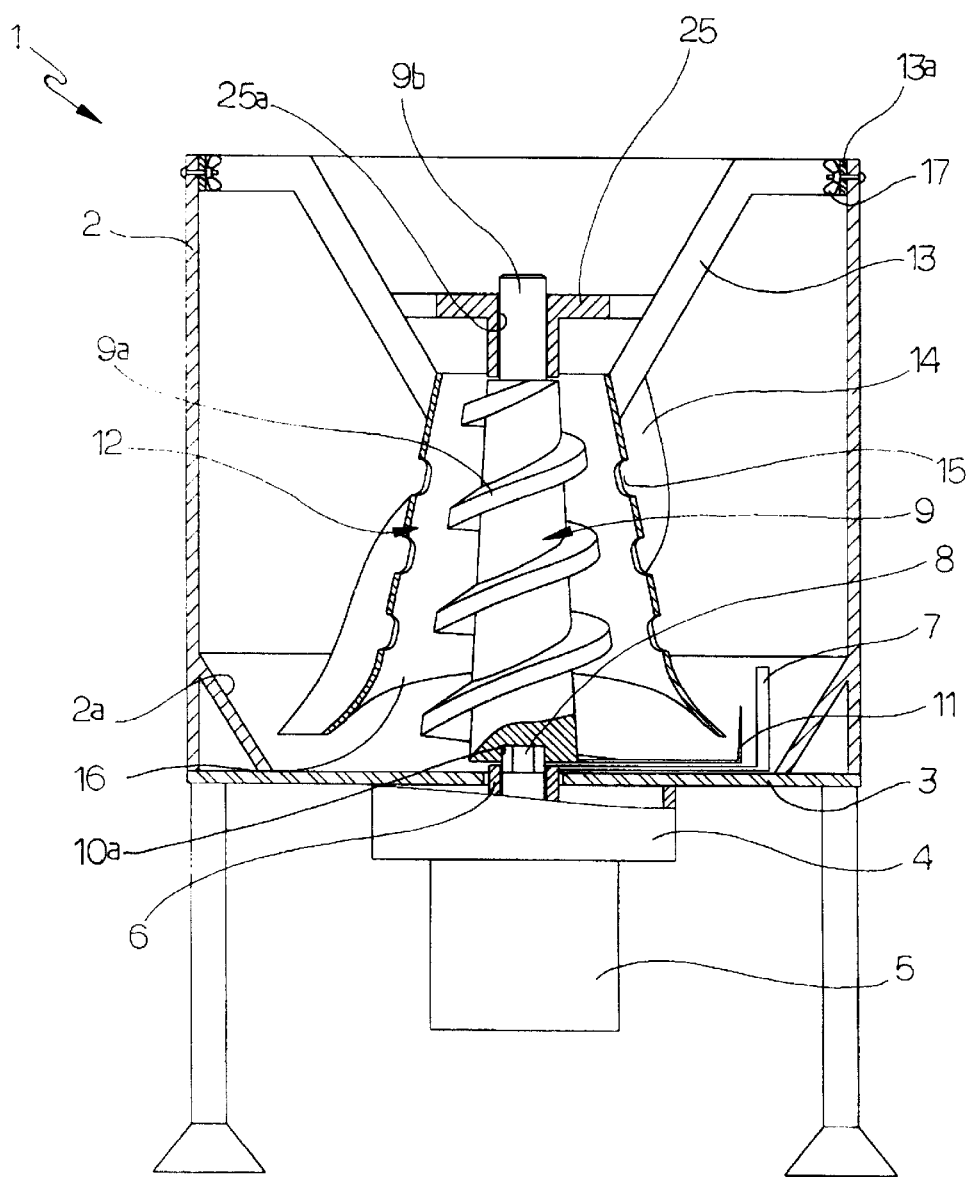
[FIG 3]

[FIG 4A]
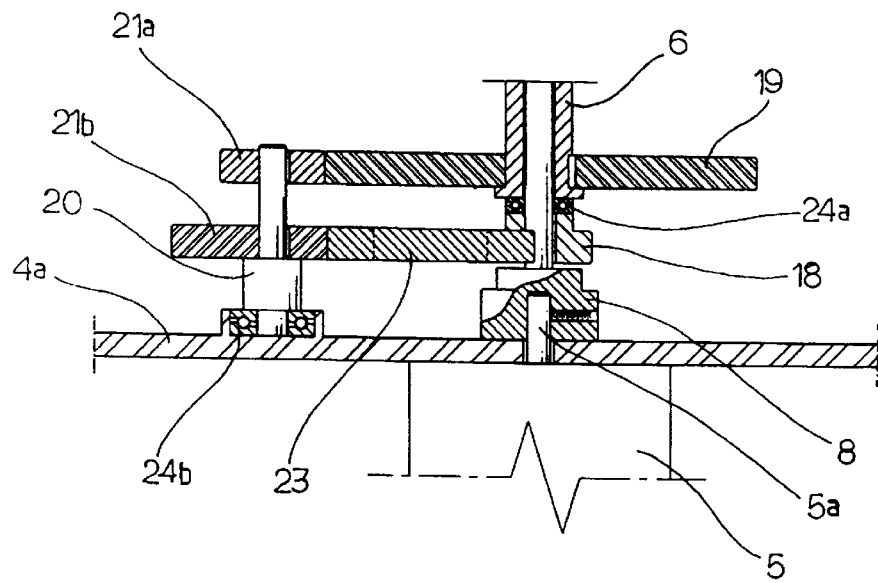
[FIG 4B]
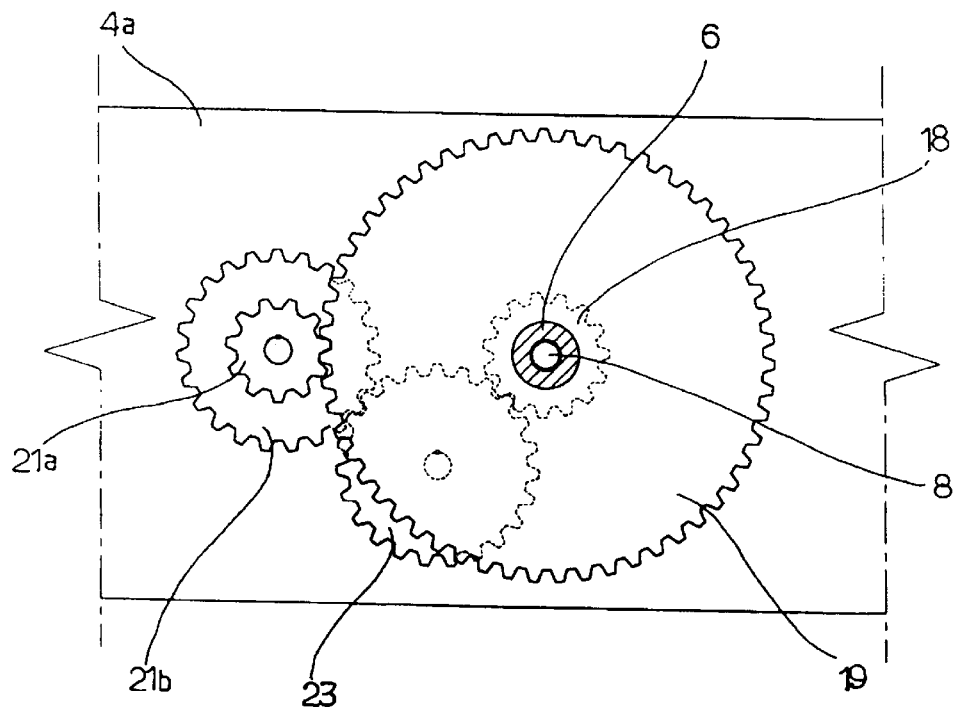

APPARATUS FOR PROCESSING FOOD WASTE

BACKGROUND OF THE INVENTION

1. Field of the Invention

The present invention relates to an apparatus for processing food waste, and more particularly to an apparatus for processing food waste capable of enhancing the processing performance for food waste relative to a conventional food waste processing apparatus by highly increasing contact area of between food waste and microorganisms due to complete pulverization of food waste, in which a housing and a conical-shaped screw having a cutter are disposed in a chamber for temporarily containing food waste and biochips in the apparatus for processing food waste, wherein vertical agitating rods for properly agitating food waste and biochips are disposed at an inner lower portion of the chamber.

2. Description of the Prior Art

Food waste discharged from a home or a shop certainly produce the river contamination and furthermore the soil contamination. Even when pollution is localized to a limited area or strata of a large body of water, it has not been possible or practical to eliminate food waste from water or soil in an environmentally polluted area because food waste have viscosity and had deeply penetrated into soil.

Due to such difficulty, numerous types of systems for processing food waste in advance have been developed. One type of food waste processing systems is used to process food waste by microorganisms treatment.

FIG. 1 shows an apparatus for processing food waste by using microorganisms according to the prior art.

Referring to FIG. 1, in the conventional apparatus for processing food waste, a cover is mounted to an upper portion of a main body 30 and a fermentation tank 32 is installed in the main body 30. Food waste and biochips for supporting the propagation and the activation of microorganisms are charged into the fermentation tank 32. An impeller blade 33 of a water mill type is installed at the center of the fermentation tank 32. The impeller blade 33 is rotated by receiving a driving power generated from a motor fixed to an inner lower surface of the main body 30 and thereby it can repeatedly agitate food waste and bio chips in the fermentation tank 32. A cutter 35 for cutting food waste of great bulk and length at a predetermined size is installed at an inner bottom surface of the fermentation tank 32.

Hereinafter, the operation of the apparatus for processing food waste according to the prior art as above will be briefly described.

In the conventional apparatus for processing food waste, food waste and bio chips for supporting the propagation and the activation of microorganisms are charged into the fermentation tank 32 and then an electric current is applied to the motor. Therefore, when the motor begins to be started to run the impeller blade 33, the impeller blade 33 may be simultaneously rotated in order to equally agitate food waste and biochips charged into the fermentation tank 32.

When food waste of great bulk and length at a predetermined size are rotated and agitated during rotary motion of the impeller blade 33, food waste may be wounded around the outer circumstance of the impeller blade 33 and thereby the impeller blade 33 cannot be rotated. At this time, the cutter 35 fixed to the lower portion of the fermentation tank 32 cuts food waste of great bulk and length at a predetermined size so that the impeller blade 33 can be rotated without disturbance.

However, in this conventional apparatus for processing food waste as described above, food waste and biochips are mixed by rotating the impeller blade 33 under the condition that the size of food waste charged into the fermentation tank 32 has not been changed. Accordingly, it takes a lot of time for completely processing food waste due to operation of a microscopic organism.

While the cutter 35 may cut food waste of great bulk and length at a short length in order to smoothly rotate the impeller blade 33 without disturbance, it has not been possible or practical to crush food waste at a small size. Since the microscopic organism is stick to the surface of food waste and then ferments food waste, it takes a lot of time for completely processing and dissolving food waste due to operation of a microscopic organism.

In addition, because food waste is completely dissolved and processed in the conventional apparatus for processing food waste for a long time, it has not been possible to certainly maintain microscopic organism's existence within the fermentation tank 32 during performing a process for completely dissolving food waste.

Another problem associated with processing food waste by using the conventional apparatus is that a bad smell hangs in the air during fermentation processing of food waste.

In order to solve these problems, it is required to employ additional heating devices and deodorizing devices. Consequently, the total constitution of the apparatus for processing food waste becomes complicated and therefore it is required to have much money and a lot of time in order to maintain and repair the apparatus for processing food waste. In addition, the manufacturing cost of the apparatus for processing food waste is highly increased.

SUMMARY OF THE INVENTION

The present invention is contrived to solve the foregoing problems. It is an object of the present invention to provide an apparatus for processing food waste capable of enhancing performance of processing food waste relative to a conventional food waste processing apparatus by highly increasing contact area of between food waste and microorganisms due to complete pulverization of food waste.

In order to achieve the above object, the present invention provides an apparatus for processing food waste by using microorganism, the apparatus comprising:

a main body including a table, a chamber fixed on an upper surface of the table, a gear part mounted to a lower surface of the table and a driving motor disposed below the gear part and mechanically connected with the gear part;

a conical-shaped screw being disposed in the main body, the conical-shaped screw including a loading plate, a supporting axle upwardly protruding from an upper portion of the loading plate, a screw thread protruding from an outer surface of the loading plate and a cutter vertically formed at one side of a lower portion of the loading plate; and a hollow truncated cone-shaped housing for enclosing the conical-shaped screw being mounted onto the conical-shaped screw within the main body, the housing including pluralities of brackets disposed at outer sides of the housing, in which a rounded portion is formed at one end of the bracket and a conical-shaped guiding rail is formed at the other end of the bracket, respectively.

An inclined portion is formed at an inner circumferential lower surface of the chamber. A hollow agitating shaft upwardly protrudes from the center of the lower surface of the chamber and has pluralities of agitating rods extending radially outwardly from the agitating shaft. At this time, the agitating shaft is disposed in operative association with the gear part. A main shaft for rotating the agitating shaft in a reverse direction is inserted into the agitating shaft.

An engaging groove is formed at the center of an inner lower portion of the loading plate and thereby the upper end of the main shaft is inserted into the engaging groove of the conical-shaped screw. The housing is fixed to the main body by means of a locking member, which passes through the rounded portion of the bracket and is inserted into a wall of the chamber.

An inlet for introducing food waste into the housing and pluralities of outlets for exhausting a part of food waste toward the outside are formed through outer side surfaces divided by the guiding rail of the housing.

A fixing bush is disposed at the center of the upper portion of the housing. A through hole is formed through the center of the fixing bush. The supporting axle of the conical-shaped screw is inserted into the through hole.

As described above, in the apparatus for processing food waste according to the preferred embodiment of the present invention, a housing and a conical-shaped screw having a cutter are disposed in a chamber for temporarily containing food waste and biochips in the apparatus for processing food waste. Vertical agitating rods for properly agitating food waste and biochips are disposed at an inner lower portion of the chamber.

Due to this structure of the apparatus for processing food waste, it is possible to repeatedly agitate food waste by elevating and continuously rotating food waste due to rotation of the conical-shaped screw. Furthermore, it is possible to crush food waste at a small size.

BRIEF DESCRIPTION OF THE DRAWINGS

The above object and other characteristics and advantages of the present invention will become more apparent by describing in detail a preferred embodiment thereof with reference to the attached drawings, in which:

FIG. 1 is a longitudinal sectional view of an apparatus for processing food waste according to the prior art, showing an internal structure of the apparatus;

FIG. 2 is an exploded perspective view of an apparatus for processing food waste according to a preferred embodiment of the present invention;

FIG. 3 is a front elevational view, partly in cross section, of the apparatus for processing food waste according to the preferred embodiment of the present invention, showing an assembled state of the apparatus;

FIG. 4A is a sectional detail view of a gear part employed in the apparatus for processing food waste according to the preferred embodiment of the present invention, showing an internal structure and an operational state of the gear part; and FIG. 4B is a fragmentary plan view of a gear part employed in the apparatus for processing food waste according to the preferred embodiment of the present invention, showing the internal structure and the operational state of the gear part.

DETAILED DESCRIPTION OF THE INVENTION

Hereinafter, the preferred embodiment of the present invention will be explained in more detail with reference to the accompanying drawings.

As shown in FIGS. 2 and 3, the apparatus for processing food waste according to the preferred embodiment of the present invention comprises a main body 1 including a chamber 2 fixed on an upper surface of a table 3, a gear part 4 mounted to a lower surface of the table 3 and a driving motor 5 disposed at a position just below the gear part 4. At this time, the driving motor 5 is mechanically connected with the gear part 4.

An inclined portion 2a is formed at an inner circumstance lower surface of the chamber 2. A hollow agitating shaft 6 upwardly protrudes from the center of the inner lower surface of the chamber 2. The agitating shaft 6 is disposed in operative association with the gear part 4. The agitating shaft 6 has pluralities of agitating rods 7 extending radially outwardly from the agitating shaft 6. In detail, one end of an agitating rod 7 is fixed to the agitating shaft 6, respectively.

As best seen in FIGS. 4A and 4B, a main shaft 8 is disposed in the agitating shaft 6. At this time, an upper end of the main shaft 8 is upwardly projected from the center of the inner lower surface of the chamber 2. A lower end of the main shaft 8 is engaged with a motor shaft 5a of the driving motor 5. The main shaft 8 has a function of rotating the agitating shaft 6 in the reverse rotational direction due to its operation in association with the gear part 4.

Referring now to FIGS. 2 and 3, a conical-shaped screw 9 is disposed onto the upper end of the main shaft 8 of the driving motor 5 within the chamber 2. The conical-shaped screw 9 includes a loading plate 10, a supporting axle 9b upwardly protruding from an upper portion of the loading plate 10, a screw thread 9a protruding from an outer surface of the loading plate 10 and a cutter 11 vertically formed at one side of a lower surface of the loading plate 10. An engaging groove 10a is formed at the center of an inner lower portion of the loading plate 10 and thereby the upper end of the main shaft 8 is inserted into the engaging groove 10a of the conical-shaped screw 9.

A hollow truncated cone-shaped housing 12 for enclosing the conical-shaped screw 9 is mounted onto the conical-shaped screw 9 within the main body 1. The housing 12 includes pluralities of brackets 13 disposed at outer sides thereof. A rounded portion 13a is formed at one end of the bracket 13 and a conical-shaped guiding rail 14 is formed at the other end of the bracket 13, respectively. The housing 12 is fixed to the main body by means of a locking member 17 that passes through the rounded portion 13a of the bracket 13 and is inserted into a wall of the chamber 2.

An inlet 16 for introducing food waste into the housing 12 and pluralities of outlets 15 for exhausting a part of food waste toward the outside are formed through outer side surfaces which are divided by the guiding rail 14 of the housing 12. A fixing bush 25 is disposed at the center of the upper portion of the housing 12. At this time, a through hole 25a is formed through the center of the fixing bush 25. When the conical-shaped screw 9 is disposed in the chamber 2 of the main body 1, the supporting axle 9b of the conical-shaped screw 9 is inserted into the through hole 25a.

Referring now to FIGS. 4A and 4B, the gear part 4 is disposed in operative association with the main shaft 8 for rotating the conical-shaped screw 9 and the agitating shaft 6 for rotating the agitating rod 7. For this purpose, the gear part 4 includes pluralities of gears that are mechanically connected together. In other words, the gear part 4 is provided with a main gear 18 fixed to a lower portion of the main shaft 8 within a gear frame 4a of the gear part 4. At this time, the lower portion of the main shaft 8 is engaged with a motor axle 5a of the driving motor 5 by means of a bolt.

The hollow agitating shaft 6 is engaged with an agitating gear 19 at its lower portion. At this time, the main shaft 8 is inserted into the agitating shaft 6 at a position above the main gear 18. In order to smoothly rotate the agitating shaft 6 around the main shaft 8, a bearing 24 is disposed between the agitating shaft 6 and the main gear 18.

An auxiliary shaft 20 is disposed at a position adjacent to the main shaft 8. At this time, a lower end of the auxiliary shaft 20 is supported by a bearing 24b fixed to a lower surface of the gear frame 4a. An upper end of the auxiliary shaft 20 is engaged with an auxiliary gear 21a in operative association with the agitating gear 19. An auxiliary gear 21b is disposed at a middle portion of the auxiliary shaft 20 in operative association with the main gear 18 via a middle gear 23.

Preferably, a sectional shape of the engaging groove 10a is a polygonal shape such as a square or a hexagon so that there is no slip between the distal end of the main shaft 8 and the conical-shaped screw 9 during rotation of the main shaft 8.

A variety of locking fixtures can be used as the engaging member 17 for fixing the housing 12 to the upper portion of the chamber 2. For example, a bolt and a nut can be used as the engaging member 17. This bolt passes through the rounded portions 13a of the bracket 13 and then is inserted into an upper wall of the chamber 2. The nut is engaged with the bolt exposed to the outside of the chamber 2. Alternatively, a clamp for simultaneously tightening and fixing the rounded portion 13a of the bracket 13 and the upper wall of the chamber 2 can be used as the engaging member 17. Alternatively, a U-shaped locking fixture to be installed at the upper wall of the chamber 2 can be used as the engaging member 17.

In order to assemble the apparatus for processing food waste as described above, the conical-shaped screw 9 is disposed onto the upper end of the main shaft 8 upwardly protruding from the inner lower surface of the chamber 2 with inserting the upper end of the main shaft 8 into the engaging groove 10a formed in the conical-shaped screw 9. Thereafter, the housing 12 is fitted onto the upper portion of the conical-shaped screw 9 in the chamber 2 with enclosing the conical-shaped screw 9. At this time, the supporting axle 9b protruding from the upper end of the conical-shaped screw 9 is inserted into the through hole 25a of the fixing bush 25 fixed to the upper portion of the housing 12. Then, the rounded portion 13a formed at the distal end of the bracket 13 is fixedly mounted on the upper inner surface of the chamber 2 by means of the locking member 17.

Hereinafter, the operation of the apparatus for processing food waste according to the embodiment the present invention as above will be described in detail with reference drawings FIGS. 2 to 4B.

At first, food waste and biochips for supporting the propagation and the activation of microorganism are charged into the chamber 2 installed at the upper portion of the main body 1. When an electric current is applied to the driving motor 5 installed at the upper surface of the table 3 of the main body 1, then the driving motor 5 begins to be operated. At this time, the conical-shaped screw 9 engaged with the distal end of the main shaft 8 disposed in operative association with the driving motor 5 begins to be rotated.

And continuously the agitating shaft 6 fitted onto the upper portion of the main shaft 8 is rotated in a direction opposite to the rotational direction of the main shaft 8 by means of gears disposed in operative association with the main gear 18 engaged with the main shaft 8 as shown in FIG. 4B. When the agitating rod 7 rotates in accordance with the rotation of the agitating shaft 6, food waste and biochips are agitated in the chamber 2 and continuously transferred toward the center portion of the chamber 2. Food waste and bio chips transferred to the center portion of the chamber 2 are rotated by the loading plate 10 of the conical-shaped screw 9 rotating a direction opposite to the rotational direction of the agitating rod 7. At this time, the cutter 11 protruded from the one end of the loading plate 10 cuts food waste of great bulk and length at a predetermined size.

Food waste and bio chips being transferred by the loading plate 10 are introduced into the housing 12 through the inlet 16 of the housing 12 along the guiding rail 14 protruding from the outer side surface of the housing 12. Food waste and bio chips introduced into the housing 12 are moved toward the upper portion of the housing 12 due to rotation of the conical-shaped screw 9 along the screw thread 9a of the conical-shaped screw 9 and continuously crushed by strongly squeezed against the inner surface of the housing 12 and then exhausted to the outside.

After being squeezed by the conical-shaped screw 9, a part of food waste and a part of bio chips are exhausted from the housing 12 to the outside through the outlet 15 formed through the side surface of the housing 12. Accordingly, it is possible to prevent an over load from being applied to the driving motor 5. In addition, since the upper portion of the conical-shaped screw 9 can be firmly supported and rotated by the fixing bush 25 fixed to the upper portion of the hosing 12, it is possible to prevent the conical-shaped screw 9 from being separated from the main shaft 8 due to shaking of the conical-shaped screw 9 right and left by receiving a compression force generated from the conical-shaped screw 9.

By repeatedly performing the agitating and the squeezing processes of food waste, food waste may be crushed as small pieces and then completely powdered. As a result, contact area of between food waste and the microorganisms for decomposing food waste is highly increased. Consequently, it can promote fermentation of the microorganisms and thereby the time required for processing food waste is remarkably reduced.

As described above, in the apparatus for processing food waste according to the preferred embodiment of the present invention, the conical-shaped screw having the loading plate of which the cutter is formed at the lower portion thereof is disposed in the chamber to which food waste and bio chips are charged in. Further, the housing is disposed onto the conical-shaped screw with enclosing the conical-shaped screw within the chamber. In addition, the agitating axle rotating in a rotational direction with opposite to direction of the rotating direction of the conical-shaped screw is installed at the lower portion of the chamber.

Due to this structure of the apparatus for processing food waste, it is possible to repeatedly agitate food waste by elevating and rotating food waste during rotation of the conical-shaped screw. Further, it is possible to crush food waste as small pieces and then completely to powder food waste due to strong squeezing force of the conical-shaped screw. As a result, contact area of between food waste and the microorganisms for decomposing food waste is highly increased. Consequently, it can promote fermentation of the microorganisms and thereby the time required for processing food waste is remarkably reduced.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An apparatus for processing food waste by using microorganism, the apparatus comprising:

a main body including a table, a chamber fixed on an upper surface of the table, a gear part mounted to a lower surface of the table and a driving motor disposed below the gear part and mechanically connected with the gear part;

a conical-shaped screw being disposed in the main body, the conical-shaped screw including a loading plate, a supporting axle upwardly protruding from an upper portion of the loading plate, a screw thread protruding from an outer surface of the loading plate and a cutter vertically formed at one side of a lower portion of the loading plate; and a hollow truncated cone-shaped housing for enclosing the conical-shaped screw being mounted onto the conical-shaped screw within the main body, the housing including pluralities of brackets disposed at outer sides of the housing, in which a rounded portion is formed at one end of a bracket and a conical-shaped guiding rail is formed at the other end of the bracket, respectively.

2. An apparatus for processing food waste by using microorganism as claimed in claim 1, wherein an inclined portion is formed at an inner circumferential lower surface of the chamber, a hollow agitating shaft upwardly protrudes from the center of the lower surface of the chamber and has pluralities of agitating rods extending radially outwardly from the agitating shaft, the agitating shaft being disposed in operative association with the gear part, a main shaft for rotating the agitating shaft in a reverse direction is inserted into the agitating shaft, an upper end of the main shaft upwardly protrudes from the lower portion of the chamber, and a lower end of the main shaft is engaged with a motor shaft of the driving motor.

3. An apparatus for processing food waste by using microorganism as claimed in claim 2, wherein an engaging groove is formed at the center of an inner lower portion of the loading plate and thereby the upper end of the main shaft is inserted into the engaging groove of the conical-shaped screw, the housing is fixed to the main body by means of a locking member which passes through the rounded portion of the bracket and is inserted into a wall of the chamber, wherein an inlet for introducing food waste into the housing and pluralities of outlets for exhausting a part of food waste toward the outside are formed through outer side surfaces which are divided by the guiding rail of the housing, a fixing bush is disposed at the center of the upper portion of the housing, a through hole is formed through the center of the fixing bush, in which the supporting axle of the conical-shaped screw is inserted into the through hole.

* * * * *